US011152826B2

United States Patent
Fauvel et al.

(10) Patent No.: US 11,152,826 B2
(45) Date of Patent: Oct. 19, 2021

(54) ROTORS FOR ELECTRICAL MACHINES

(71) Applicant: Goodrich Actuation Systems SAS, Saint-Ouen-l'Aumone (FR)

(72) Inventors: Romain Fauvel, Port-Marly (FR); Gilles Warrot, Acheres (FR); Gregory Meignat, St. Germain en Laye (FR); Arnauld Hervieux, Versailles (FR)

(73) Assignee: GOODRICH ACTUATION SYSTEMS S.A.S., Buc (FR)

( * ) Notice: Subject to any disclaimer, the term of this patent is extended or adjusted under 35 U.S.C. 154(b) by 542 days.

(21) Appl. No.: 16/040,741

(22) Filed: Jul. 20, 2018

(65) Prior Publication Data
US 2019/0027986 A1    Jan. 24, 2019

(30) Foreign Application Priority Data
Jul. 21, 2017    (EP) .................................... 17305978

(51) Int. Cl.
*H02K 1/27* (2006.01)
*H02K 1/30* (2006.01)
(Continued)

(52) U.S. Cl.
CPC .............. *H02K 1/30* (2013.01); *H02K 1/278* (2013.01); *H02K 1/28* (2013.01); *H02K 15/03* (2013.01); *H02K 2201/09* (2013.01)

(58) Field of Classification Search
CPC .......... H02K 1/27; H02K 1/273; H02K 1/276; H02K 1/278; H02K 1/28; H02K 1/30; H02K 15/031
See application file for complete search history.

(56) References Cited

U.S. PATENT DOCUMENTS 4,115,716 A * 9/1978 Ogasawala .............. H02K 1/27
                                                     310/153
4,255,681 A    3/1981 Gerber
                    (Continued)

FOREIGN PATENT DOCUMENTS

| DE | 202006019091 U1 | 4/2008 |
| EP | 1193827 A2 | 4/2002 |
| GB | 765627 A | 1/1957 |

OTHER PUBLICATIONS

Extended European Search Report for International Application No. 17305978.3 dated Feb. 7, 2018, 10 pages.

*Primary Examiner* — Tran N Nguyen
(74) *Attorney, Agent, or Firm* — Cantor Colburn LLP

(57) ABSTRACT

A rotor for an electrical machine comprises a rotor body having an external, axially extending magnet receiving surface for receiving at least one magnet thereon, and a flange mounting portion at at least one axial end of the magnet receiving surface. The flange mounting portion has a smaller external dimension (D1) than an external dimension (D2) of the magnet receiving surface so as to form a shoulder between the magnet receiving surface and the flange mounting portion. A magnet retaining flange is mounted over the flange mounting portion of the rotor body and located against the shoulder. The magnet retaining flange is retained against the shoulder by at least one lip of the flange mounting portion of the rotor body which extends radially outwardly over a radially inner portion of the magnet retaining flange. The lip by deforming an end face of the flange mounting portion.

13 Claims, 7 Drawing Sheets

(51) Int. Cl.
*H02K 15/03* (2006.01)
*H02K 1/28* (2006.01)

(56) References Cited

U.S. PATENT DOCUMENTS

| | | |
|---|---|---|
| 2002/0158544 A1 | 10/2002 | Bobay et al. |
| 2008/0078631 A1 | 4/2008 | Erlston |
| 2009/0284093 A1* | 11/2009 | Shiao ............... H02K 1/278 310/156.22 |
| 2009/0315423 A1* | 12/2009 | Suzuki ............... H02K 1/276 310/156.12 |
| 2014/0028119 A1 | 1/2014 | Sagalovskiiy et al. |

* cited by examiner

ROTORS FOR ELECTRICAL MACHINES

FOREIGN PRIORITY

This application claims priority to European Patent Application No. 17305978.3 filed Jul. 21, 2017, the entire contents of which is incorporated herein by reference.

TECHNICAL FIELD

The present disclosure relates to rotors for use in electrical machines and methods for making the rotors.

BACKGROUND

Electrical machines typically comprise a stator and a rotor. In a generator, relative movement between the rotor and stator generate electricity. In a motor, electrical energy supplied to the rotor or stator produces relative rotational movement between the rotor and stator.

A typical rotor comprises a body on which is mounted a plurality of magnets. The magnets are arranged circumferentially around the rotor body and are typically maintained in position axially of the body by means of respective flanges provided on the body. The flanges are machined into a solid rotor body to provide an annular channel to receive the magnets. This may be wasteful of material and time-consuming.

SUMMARY

In accordance with this disclosure, there is provided a rotor for an electrical machine. The rotor comprises a rotor body having an external, axially extending magnet receiving surface for receiving at least one magnet thereon and a flange mounting portion at at least one axial end of the magnet receiving surface. The flange mounting portion has a smaller external dimension than an external dimension of the magnet receiving surface so as to form a shoulder between the magnet receiving surface and the flange mounting portion. A magnet retaining flange is mounted over the flange mounting portion of the rotor body and located against the shoulder. The magnet retaining flange may be retained against the shoulder by at least one lip of the flange mounting portion of the rotor body which extends radially outwardly over a radially inner portion of the magnet retaining flange.

An embodiment of the above may comprise a plurality of circumferentially spaced lips. Optionally, the plurality of circumferentially spaced lips may be equally spaced around a circumference of the flange mounting portion of the rotor body.

In embodiments of any of the above, the flange mounting portion of the rotor body may have an axially facing end surface, and the lip may be formed by an indentation formed in a radially outer peripheral region of the axially facing end surface. The indentation may be part-spherical in shape.

Embodiments of any of the above may comprise a flange mounting portion at both ends of the magnet receiving surface and respective magnet retaining flanges mounted thereto.

In embodiments of any of the above, the magnet receiving surface may comprise a polygonal cross-section.

Embodiments of any of the above may comprise a plurality of magnets received on the magnet receiving surface of the rotor body and axially retained thereon by the at least one magnet retaining flange.

In embodiments of any of the above, the rotor body may be is made from a different material from the flange. The rotor body may be made from a magnetic, material and the flange may be made from a non-magnetic material, for example.

The disclosure also provides a method of manufacturing a rotor for an electric machine which comprises providing a rotor body having an external, axially extending magnet receiving surface and a flange mounting portion at at least one axial end of the external surface and having a smaller external dimension than an external dimension of the magnet receiving surface to form a shoulder therebetween. The method further comprises mounting a magnet retaining flange over the flange mounting portion of the rotor body and against the shoulder and retaining the flange against the shoulder by deforming a radially outer peripheral portion of the flange mounting portion of the rotor body adjacent the retaining flange such that it forms a lip which extends over a radially inner portion of the retaining flange.

An embodiment of the above may comprise deforming a plurality of circumferentially spaced regions of the flange mounting portion of the rotor body to form a plurality of circumferentially spaced lips.

In embodiments of any of the above, the providing a rotor body may comprise machining the magnet receiving surface of the rotor body prior to mounting the magnet retaining flange to the rotor body. The machining may comprise turning and/or milling.

In embodiments of any of the above, the deforming may comprise pressing a deforming element into a radially outer peripheral region of an end face of the flange mounting portion of the rotor body so as to form an indentation therein and locally to deform the peripheral region radially outwardly to form the lip.

In embodiments, the pressing may comprise pressing a plurality of spherical ball elements into a plurality of circumferentially spaced locations in the peripheral region of the end face of the flange mounting portion.

DETAILED DESCRIPTION

Figure 1:
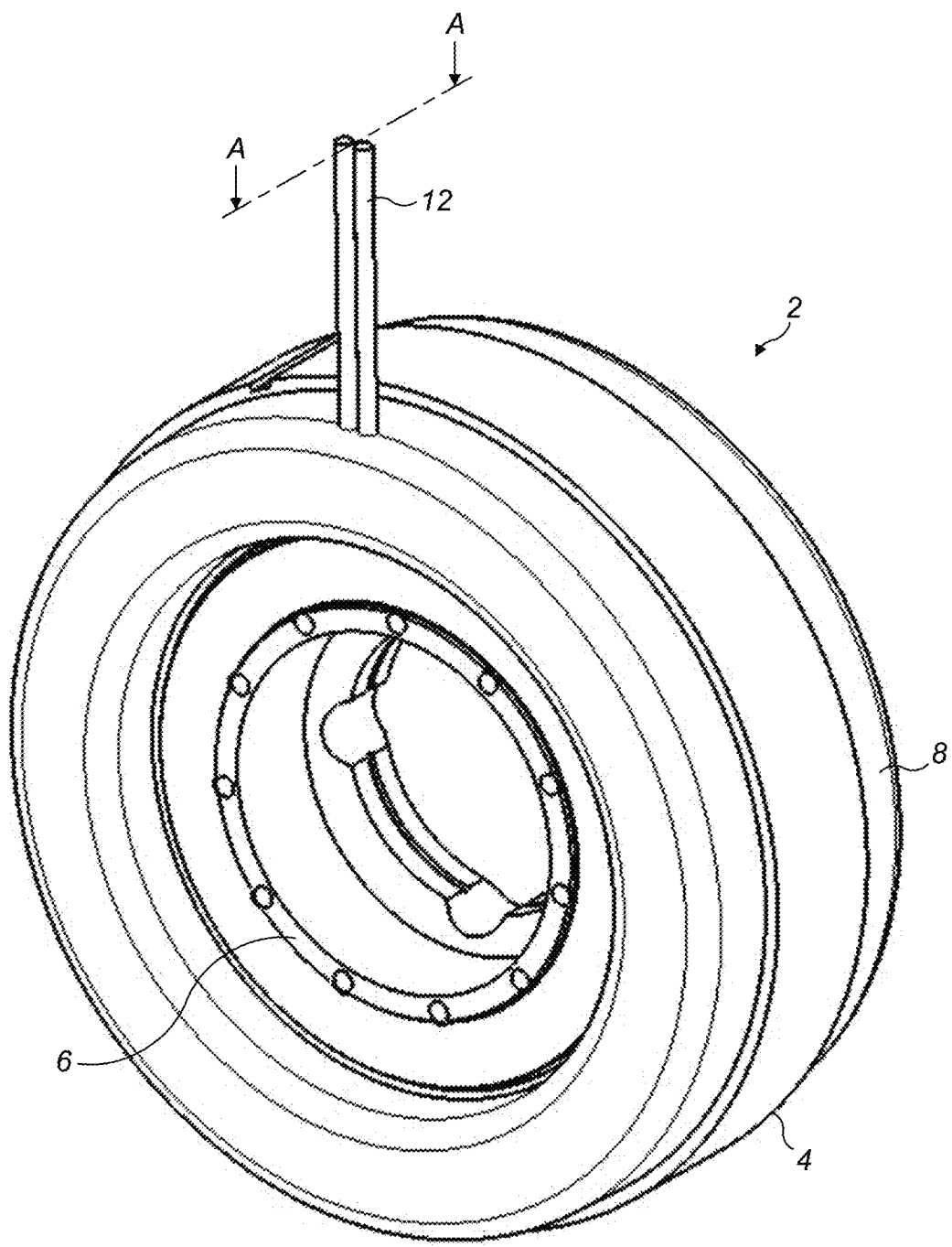
FIG. 1 shows a perspective view of a motor in accordance with the disclosure.
Figure 2:
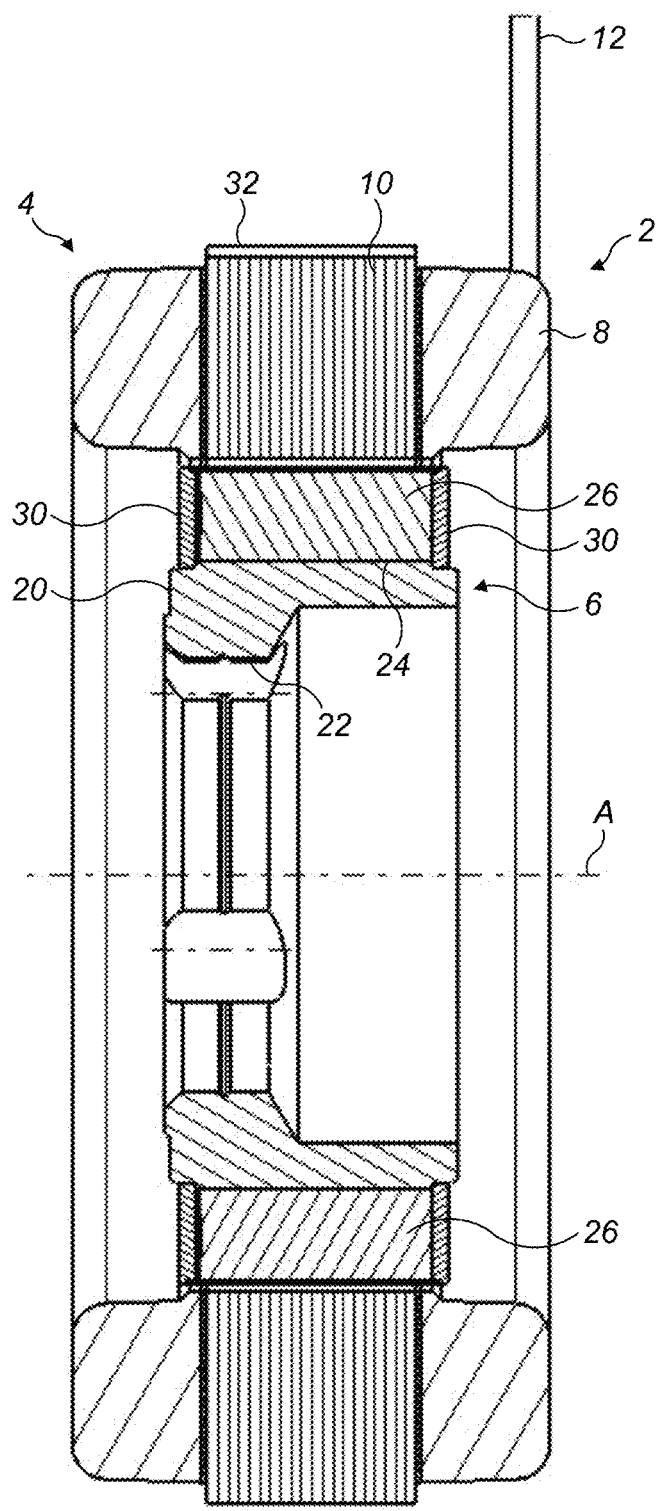
FIG. 2 shows a cross-sectional view along line A-A of FIG. 1.

With reference to FIGS. 1 and 2, an electric motor 2 comprises a stator 4 and a rotor 6 which rotates about an axis A. In this embodiment, the motor 2 may be a torque motor, although the disclosure applies to other types of motor and indeed to other types of electrical machinery.

The stator 4 comprises a stator body 8 and windings or coils 10 arranged around the stator body 8. Electrical power is connected to the stator windings or coils 10 by electrical leads 12.

The rotor 6 comprises a rotor body 20 having a central bore 22. Central bore 22 may receive a shaft (not shown) for transmitting rotary motion to a further element (also not shown).

Figure 4:
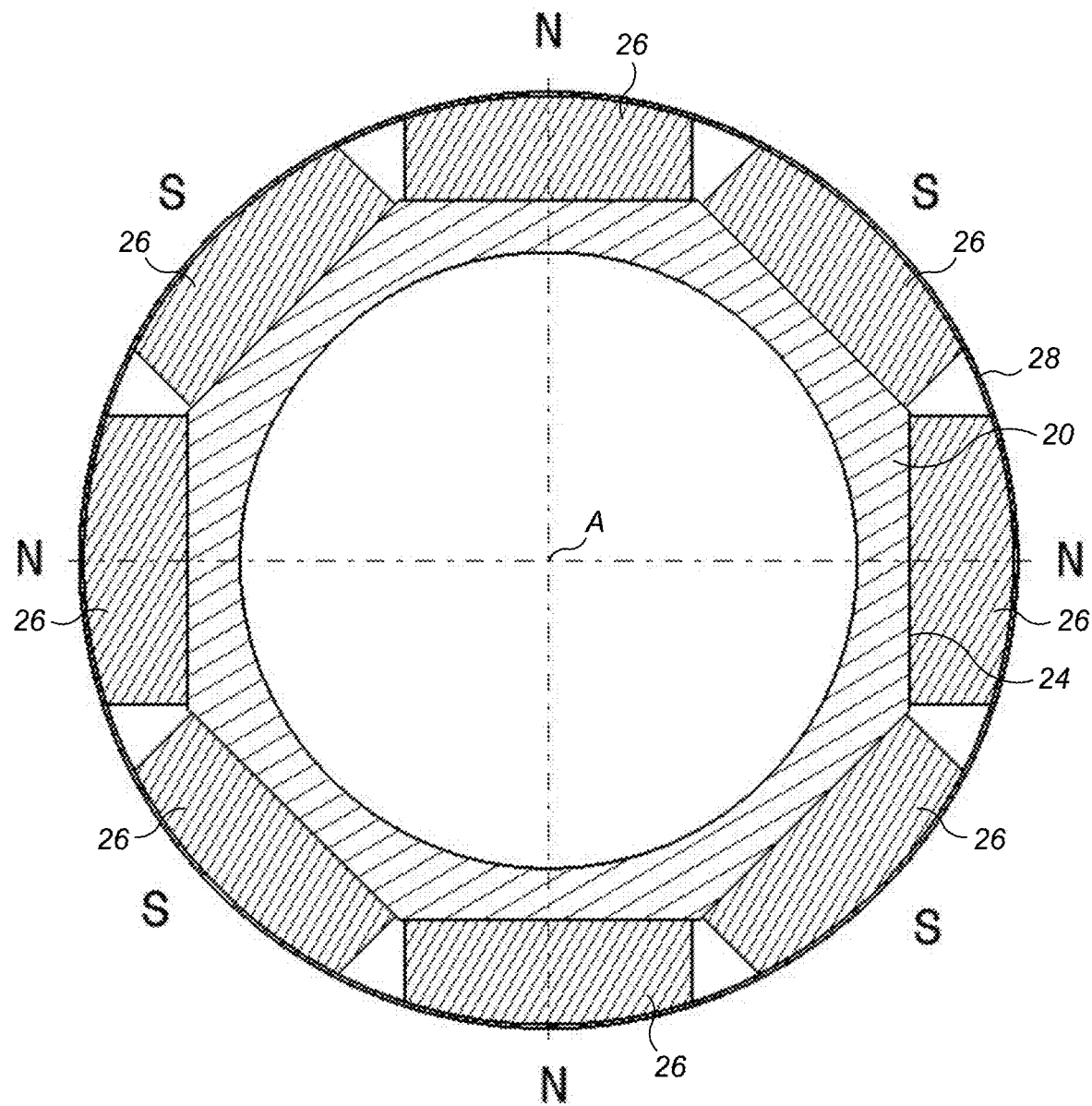
FIG. 4 shows a cross-sectional view along the line B-B of FIG. 3.

The rotor body 20 comprises an external, axially extending surface 24 for receiving a plurality of magnets 26 thereon. In this embodiment, as can be seen in FIG. 4, eight magnets 26 are arranged on the surface 24 although in accordance with the disclosure, more or fewer than eight magnets 26 may be provided. As will be seen from FIGS. 4 and 6, in this embodiment, the axially extending surface 24 is a polygonal, more particularly octagonal. The particular polygonal shape will depend on the number of magnets 26 used. The axially extending surface 24 may be machined on the rotor body 20 using traditional turning and milling techniques for example.

In this embodiment, the rotor body 20 is formed from a magnetic stainless steel material, although other materials for example other magnetic materials may be used.

The magnets 26 are retained axially on the rotor body by respective flanges 30 mounted to the rotor body 20 at respective ends of the axially extending surface 24. As will be explained further below, the flanges 30 are mounted to the rotor body 20 by a deformation process. A retaining band 28 is provided around the magnets 26 to retain the magnets 26 radially on the rotor body 20, in a traditional manner. In this embodiment, the flanges 30 are made from a non-magnetic material, for example a non-magnetic stainless steel material. However, other materials may be used for the flanges 30.

Figure 3:
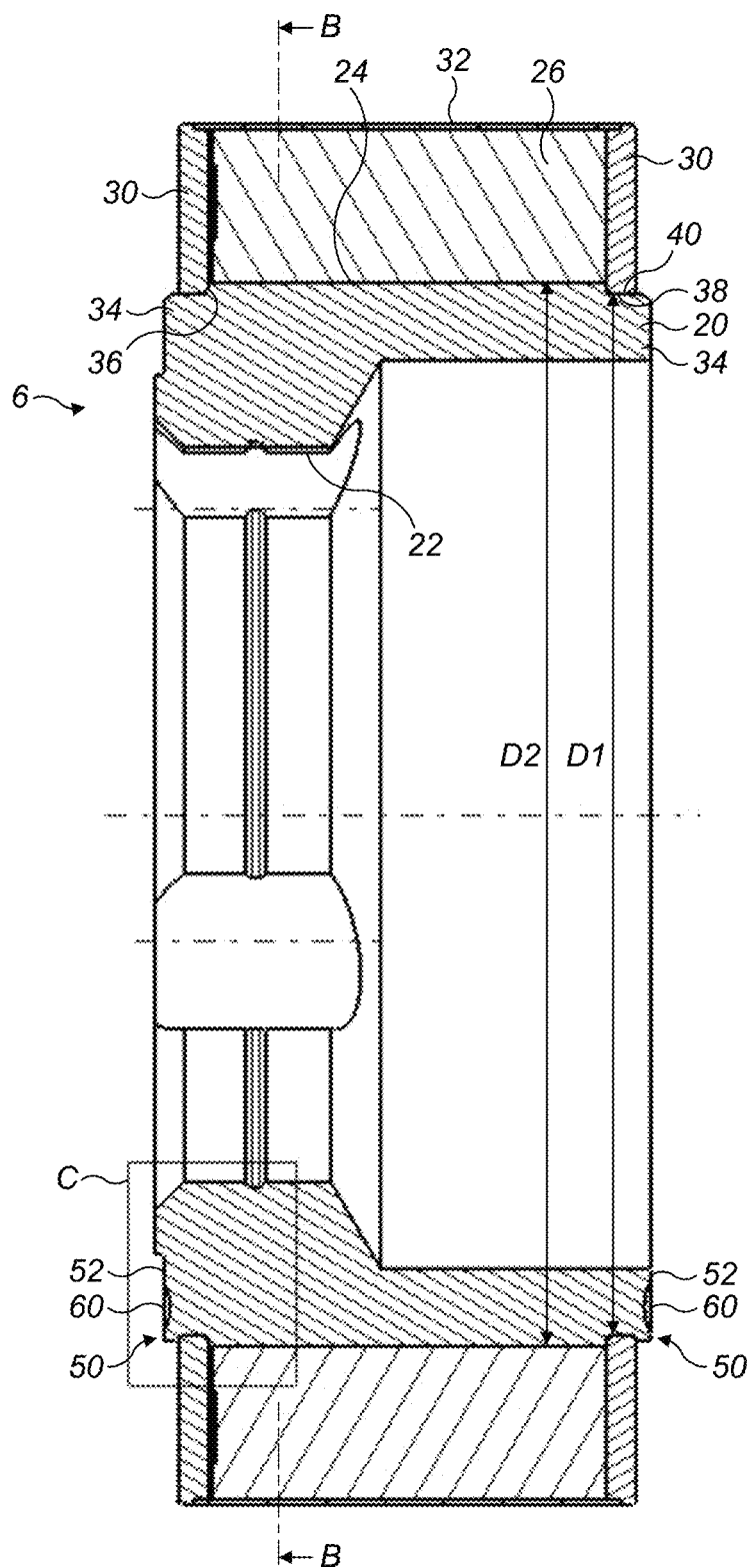
FIG. 3 shows a cross-sectional view of just the rotor of the motor of FIG. 1, taken along line A-A of FIG. 1.

As can be seen from FIGS. 2 and 3, the rotor body 20 comprises a flange mounting portion 34 at each end of the axially extending surface 24. The flange mounting portion 34 has an external dimension D1 which is smaller than the external dimension D2 of the axially extending surface 24 such that a radially extending shoulder 36 is formed between the flange mounting portion 34 and the axially extending surface 24. In this embodiment, the external surface 38 of the flange mounting portion 34 may be circular, although other shapes may be appropriate. However, a circular shape may be advantageous in that it may be more easily manufactured. With a circular external surface 38, the shoulder 36 will vary in depth circumferentially around the rotor body 20. In various embodiments, the shoulder 36 will be circumferentially continuous, although in other embodiments, it may be circumferentially discontinuous.

The flanges 30 have radially inward surfaces 40 which are received over the flange mounting portions 34 of the rotor body 20. In embodiments, the radially inward surfaces 40 are complementary in shape to the shape of the external surface 38 of the flange mounting portion 34. Thus, in one embodiment, both surfaces may be circular in shape. In various embodiments, the flanges 30 may be a sliding fit over the flange mounting portions 34. When fully engaged on the flange mounting portion 34, a radially inner portion 44 of the flange 30 engages the shoulder 36. To facilitate proper engagement of the flange 30 with the shoulder 36, the radially inner portion 44 may comprise a chamfer 46.

Figure 5:
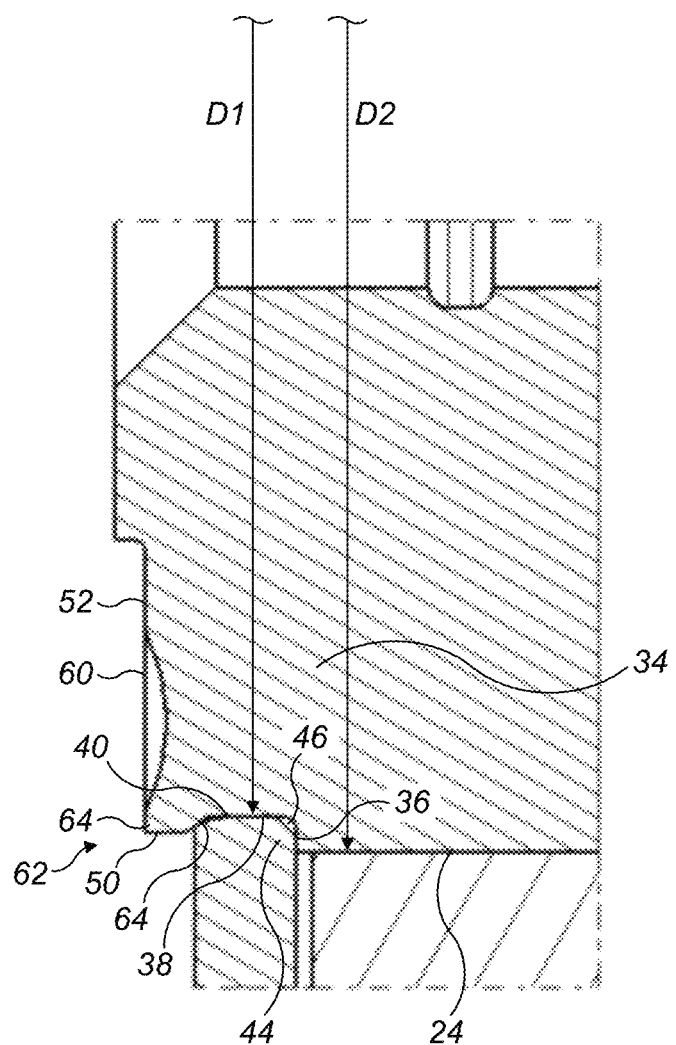
FIG. 5 shows detail C of FIG. 3 in a larger scale.
Figure 6:
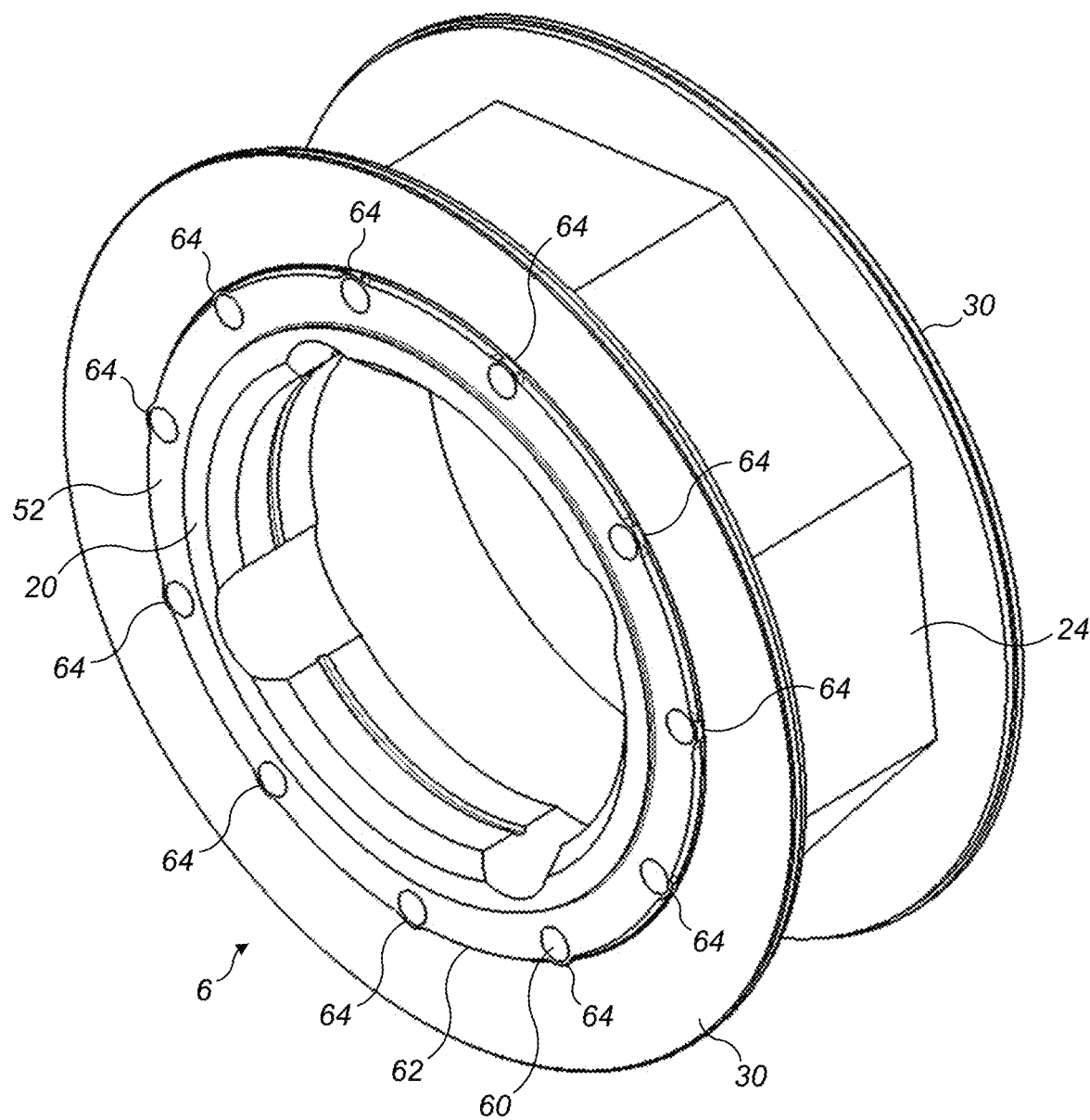
FIG. 6 shows a perspective view of the rotor body illustrated in FIGS. 3 to 5.

It will be seen that each flange mounting portion 34 of the rotor body 20 has a portion 50 which projects axially beyond the flange 30. This projecting portion 50 includes an axially facing end face 52. As can be seen in FIGS. 3, 5 and 6 in particular, a plurality of indentations 60 are formed in a radially outer peripheral portion 62 of the end face 52 such that the radially outer peripheral portion 62 of the projecting portion 50 is deformed over the inner edge of the adjacent inner portion 44 of the flange 30 to form a plurality of retaining lips 64. In this embodiment, there are eleven indentations 60 formed around the circumference of the end face 52. The indentations 60 may be equally spaced in various embodiments. The effect of this is that a plurality of retaining lips 64 are created around the end face 52, the lips 64 projecting over the adjacent radially inner portions 44 of the flange 30 to retain the flange 30 in position.

The precise number and size of indentations 60 and their position and spacing around the end face 52 may be determined on a case to case basis. However, the effect should be to retain the flange 30 securely in position.

In various embodiments, the indentations 60 may be made by impressing spherical balls onto the end face 52. In other embodiments, however, the indentations 60 may be formed by other shapes of element, or indeed by any other deformation process.

Figure 7:
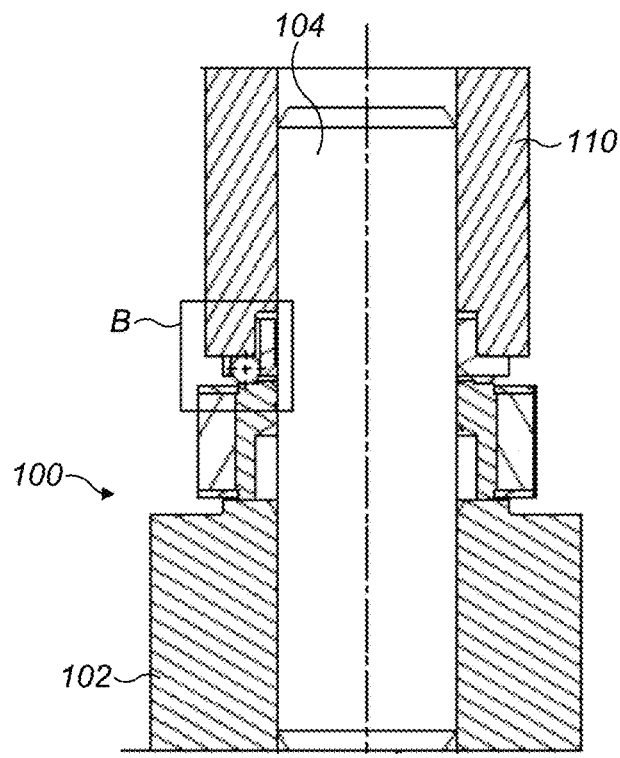
FIG. 7 illustrates an apparatus for attaching the flange of the rotor body.
Figure 8:
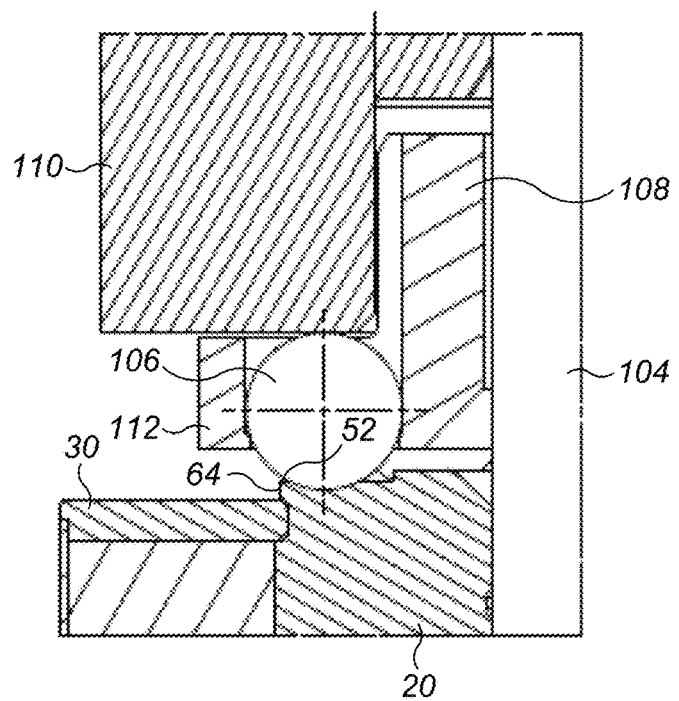
FIG. 8 illustrates a detail of FIG. 7.

An embodiment of apparatus 100 suitable for producing the indentations 60 is illustrated in FIGS. 7 and 8.

The apparatus 100 comprises a base 102 which receives the rotor body 20 and flange 30 to be joined. The rotor body 20 is located on the base 102 by means of a mandrel 104. Prior to its location on the mandrel 104, the rotor body 20 is machined to produce the magnet receiving surfaces 30 and flange receiving portions 34.

A plurality of spherical balls 106 is retained in a cage 108 which is also located over the mandrel 104. A press tube 110 is also located over the mandrel 104. As can be seen from FIG. 8, the balls 106 are of a greater diameter than the depth of the pockets 112 of the cage 108 in which they are located.

To produce the indentations (60), the press tube 110 it moved toward the base 102 so as to engage the balls 106 and press them into the end surface 52 of the rotor body 20 without interference from the cage 108. The depth of the indentation 60 and the size of the lip 64 formed thereby will depend, inter alia, on the force applied by the press tube 110, the diameter of the balls 106 and the material of the rotor body 20. The indentations 60 produced by the balls 106 will be part-spherical in shape.

In one example, the balls 106 may have a diameter of 4 mm. The diameter D1 of the outer surface 38 of the flange receiving portion 34 of the rotor body 20 may be 35.5 mm and the pitch diameter on which the indentations are formed be at 33.6 mm. With an axial load of approximately 93 kN an indentation 60 having a diameter of approximately 1.8 mm may be produced. This will produce a sufficient size of lip 64 to retain the flange 30. The skilled person will be able to determine appropriate parameters to provide suitable retention of the flange 30 taking into account the properties, for example hardness, of the rotor body 20.

It will be recognised from the above that the disclosure in various embodiments may provide a number of advantages over traditional constructions using one-piece rotors.

Firstly, it may be easier to manufacture the axially extending surfaces 24 of the rotor body, since access to the surfaces for a milling or other cutting tool will not be hindered by the flanges 30. Thus, simpler machining techniques may be used in making the rotor body 20. This may also reduce the time required for machining the rotor body 20.

In addition, a smaller blank may be used to make the rotor body 20, since it is not necessary to machine the flanges 30 from the blank 20. This represents a potentially significant material cost saving and reduces waste.

Also, the disclosure may potentially be advantageous in that it permits different materials to be used for the rotor body 20 and the Flanges 30. Thus the properties of the rotor body 20 and flanges 30 may be optimised, for example to improve the magnetic performance of the motor. Thus, for example, in embodiments of the disclosure, the rotor body 20 may be of a magnetic material and the flanges 30 be of a non-magnetic material.

This general arrangement may be advantageous independently, so from a further aspect, which the Applicant expressly reserves the right to claim, this disclosure also provides a rotor for an electrical machine comprising: a rotor body having an external, axially extending magnet receiving surface for receiving at least one magnet thereon, a magnet retaining flange arranged at at least one end of the magnet receiving surface; the magnet retaining flange being a separate component from the rotor body and optionally made from a different material therefrom.

The embodiment described above is intended to be exemplary only and the skilled person will recognise that modifications may be made thereto without departing from the scope of the disclosure.

For example, although the indentations 60 have been described as being produced by spherical balls 106, the indentations 60 could be produced by other deformation processes provided those methods produce a lip 64 which overlaps the flange 30 and retains it in position. Accordingly other, crimping techniques may be used within the scope of the disclosure.

The invention claimed is:

1. A rotor for an electrical machine comprising:
a rotor body having an external, axially extending magnet receiving surface for receiving at least one magnet thereon, and a flange mounting portion at least one axial end of the magnet receiving surface, the flange mounting portion having a smaller external dimension (D1) than an external dimension (D2) of the magnet receiving surface so as to form a shoulder between the magnet receiving surface and the flange mounting portion;
a magnet retaining flange mounted over the flange mounting portion of the rotor body and located against the shoulder;
wherein the magnet retaining flange is retained against the shoulder by at least one lip of the flange mounting portion of the rotor body, wherein the at least one lip extends radially outwardly over a radially inner portion of the magnet retaining flange;
wherein the flange mounting portion of the rotor body has an axially facing end surface, and the lip is formed by an indentation formed in a radially outer peripheral region of the axially facing end surface.

2. A rotor as claimed in claim 1, wherein the at least one lip comprises a plurality of circumferentially spaced lips.

3. A rotor as claimed in claim 1, wherein the indentation is part-spherical in shape.

4. A rotor as claimed in claim 1, comprising a second flange mounting portion, wherein the flange mounting portion is located at one end of the magnet receiving surface, the second flange mounting portion is located at the opposite end of the magnet receiving surface, and respective magnet retaining flanges mounted thereto.

5. A rotor as claimed in claim 1, wherein the magnet receiving surface comprises a polygonal cross-section.

6. A rotor as claimed in claim 1, wherein the at least one magnet comprises a plurality of magnets received on the magnet receiving surface of the rotor body and axially retained thereon by the at least one magnet retaining flange.

7. A rotor as claimed in claim 1, wherein the rotor body is made of a different material from a material that the flange is made of.

8. A rotor as claimed in claim 7, wherein the rotor body is made from a magnetic, material and the flange is made from a non-magnetic material.

9. A method of manufacturing a rotor for an electric machine the method comprising:
providing a rotor body having an external, axially extending magnet receiving surface, and a flange mounting portion at least one axial end of the external surface and having a smaller external dimension (D1) than an external dimension (D2) of the magnet receiving surface to form a shoulder therebetween;
mounting a magnet retaining flange over the flange mounting portion of the rotor body and against the shoulder; and
retaining the flange against the shoulder by deforming a radially outer peripheral portion of the flange mounting portion of the rotor body adjacent the retaining flange such that the radially outer peripheral portion of the flange mounting portion is a lip, wherein the lip extends over a radially inner portion of the retaining flange;
wherein the flange mounting portion comprises a plurality of the lips, the plurality of lips being circumferentially spaced lips, the method further comprising:
deforming a plurality of circumferentially spaced regions of the flange mounting portion of the rotor body to form a plurality of circumferentially spaced lips;
wherein the deforming comprises pressing a deforming element into a radially outer peripheral region of an end face of the flange mounting portion of the rotor body so as to form an indentation therein and locally to deform the peripheral region radially outwardly to form the lip.

10. A method as claimed in claim 9, wherein the providing a rotor body comprises machining the magnet receiving surface of the rotor body prior to mounting the magnet retaining flange to the rotor body.

11. A method as claimed in claim 10, wherein the machining comprises turning or milling.

12. A method as claimed in claim 9, wherein the deforming comprises pressing a plurality of spherical ball elements into a plurality of circumferentially spaced locations in the peripheral region of the end face of the flange mounting portion.

13. A rotor as claimed in claim 2, wherein the plurality of circumferentially spaced lips are equally spaced around a circumference of the flange mounting portion of the rotor body.

* * * * *